United States Patent
Abhyankar et al.

(10) Patent No.: US 11,829,417 B2
(45) Date of Patent: Nov. 28, 2023

(54) CONTEXT-BASED CUSTOMIZATION USING SEMANTIC GRAPH DATA

(71) Applicant: MicroStrategy Incorporated, Vienna, VA (US)

(72) Inventors: Saurabh Abhyankar, McLean, VA (US); Scott Rigney, Arlington, VA (US); Timothy Lang, McLean, VA (US)

(73) Assignee: MicroStrategy Incorporated, Vienna, VA (US)

( * ) Notice: Subject to any disclaimer, the term of this patent is extended or adjusted under 35 U.S.C. 154(b) by 461 days.

(21) Appl. No.: 16/678,948

(22) Filed: Nov. 8, 2019

(65) Prior Publication Data
US 2020/0250235 A1 Aug. 6, 2020

Related U.S. Application Data

(60) Provisional application No. 62/801,290, filed on Feb. 5, 2019.

(51) Int. Cl.
*G06F 16/9035* (2019.01)
*G06F 16/901* (2019.01)
(Continued)

(52) U.S. Cl.
CPC .... *G06F 16/9024* (2019.01); *G06F 16/24575* (2019.01); *G06F 16/24578* (2019.01);
(Continued)

(58) Field of Classification Search
CPC ............. G06F 16/9035; G06F 16/9024; G06F 16/9038; G06F 40/30; G06F 16/00; G06F 40/00
See application file for complete search history.

(56) References Cited

U.S. PATENT DOCUMENTS 8,661,012 B1 2/2014 Baker et al.
8,972,467 B2 3/2015 Heinrich et al.
(Continued)

OTHER PUBLICATIONS cio.com [online], "Why your BI strategy needs a universal semantic data layer," Nov. 10, 2017, retrieved on Feb. 27, 2020, retrieved from URL <https://www.cio.com/article/3236566/why-your-bi-strategy-needs-a-universal-semantic-data-layer.html>, 6 pages.
(Continued)

*Primary Examiner* — Sanchita Roy
(74) *Attorney, Agent, or Firm* — Fish & Richardson P.C.

(57) ABSTRACT

Methods, systems, and apparatus, including computer programs encoded on computer-readable storage media, for context-based customization using semantic graph data. In some implementations, semantic graph data indicating objects and relationships among the objects is stored. Usage data is generated to indicate (i) levels of usage of the objects and (ii) contexts in which the objects are used. A query is received that is associated with a user and that includes data indicating a context of the user. Customized weights for connections among the objects is determined based on (i) the levels of usage indicated by the usage data and (ii) scores indicating a degree of similarity among the contexts indicated by the usage data and the context of the user. A response to the query is provided based on the customized weights for the connections among the objects indicated by the semantic graph data.

19 Claims, 4 Drawing Sheets

(51) Int. Cl.
  *G06F 16/9038* (2019.01)
  *G06F 40/30* (2020.01)
  *G06F 16/2457* (2019.01)
  *G06F 18/22* (2023.01)
(52) U.S. Cl.
  CPC ...... *G06F 16/9035* (2019.01); *G06F 16/9038* (2019.01); *G06F 18/22* (2023.01); *G06F 40/30* (2020.01)

(56) References Cited

U.S. PATENT DOCUMENTS

| | | | |
|---|---|---|---|
| 9,531,829 | B1 | 12/2016 | Anand et al. |
| 10,810,371 | B2 | 10/2020 | Shinn et al. |
| 11,550,838 | B2 | 1/2023 | Abhyankar et al. |
| 2004/0220905 | A1 | 11/2004 | Chen et al. |
| 2008/0060051 | A1 | 3/2008 | Uim |
| 2008/0244540 | A1 | 10/2008 | Feblowitz et al. |
| 2011/0313987 | A1 | 12/2011 | Ghosh et al. |
| 2011/0320187 | A1 | 12/2011 | Motik et al. |
| 2012/0158636 | A1 | 6/2012 | Bowers et al. |
| 2012/0221555 | A1 | 8/2012 | Byrne et al. |
| 2012/0221558 | A1* | 8/2012 | Byrne ............... G06F 16/951 707/723 |
| 2012/0290518 | A1 | 11/2012 | Flinn et al. |
| 2013/0036117 | A1 | 2/2013 | Fisher et al. |
| 2013/0073979 | A1 | 3/2013 | Shepherd et al. |
| 2013/0254736 | A1 | 9/2013 | Chen et al. |
| 2013/0275440 | A1 | 10/2013 | Amer-Yahia et al. |
| 2014/0200891 | A1 | 7/2014 | Henri et al. |
| 2014/0236570 | A1 | 8/2014 | Heck et al. |
| 2014/0236579 | A1 | 8/2014 | Kurz |
| 2014/0267344 | A1 | 9/2014 | Wilson et al. |
| 2015/0066663 | A1* | 3/2015 | Vaynblat ............... G06Q 50/01 705/14.71 |
| 2015/0106078 | A1 | 4/2015 | Chang |
| 2015/0106156 | A1 | 4/2015 | Chang et al. |
| 2015/0227563 | A1* | 8/2015 | Walkingshaw ... G06F 16/24578 707/749 |
| 2015/0248480 | A1* | 9/2015 | Miller ............... G06Q 10/101 707/723 |
| 2015/0293954 | A1 | 10/2015 | Hsiao et al. |
| 2015/0347905 | A1 | 12/2015 | Chen et al. |
| 2016/0048368 | A1 | 2/2016 | McGibney et al. |
| 2016/0103878 | A1 | 4/2016 | Boe et al. |
| 2016/0179864 | A1 | 6/2016 | Roberts |
| 2016/0232157 | A1 | 8/2016 | Mansour et al. |
| 2016/0267198 | A1 | 9/2016 | Lahmer et al. |
| 2016/0275204 | A1 | 9/2016 | Miranker et al. |
| 2016/0328467 | A1 | 11/2016 | Zou et al. |
| 2016/0357872 | A1 | 12/2016 | Fader et al. |
| 2017/0024460 | A1 | 1/2017 | Mac an tSaoir et al. |
| 2017/0063889 | A1 | 3/2017 | Muddu et al. |
| 2017/0085446 | A1 | 3/2017 | Zhong et al. |
| 2017/0147635 | A1 | 5/2017 | McAteer et al. |
| 2017/0228435 | A1 | 8/2017 | Tacchi et al. |
| 2017/0237801 | A1 | 8/2017 | Baluja et al. |
| 2017/0262520 | A1 | 9/2017 | Mitkar et al. |
| 2017/0293947 | A1 | 10/2017 | Singh |
| 2017/0329844 | A1 | 11/2017 | Tacchi et al. |
| 2017/0372204 | A1* | 12/2017 | Sweeney ............... G06N 5/02 |
| 2018/0039854 | A1 | 2/2018 | Wren |
| 2018/0069887 | A1 | 3/2018 | Chauhan et al. |
| 2018/0089281 | A1 | 3/2018 | Li et al. |
| 2018/0089328 | A1 | 3/2018 | Bath et al. |
| 2018/0181667 | A1 | 6/2018 | Kolb et al. |
| 2018/0189388 | A1 | 7/2018 | Soares et al. |
| 2018/0189389 | A1 | 7/2018 | Soares et al. |
| 2018/0196831 | A1 | 7/2018 | Maybee et al. |
| 2018/0241660 | A1 | 8/2018 | Fletchet et al. |
| 2018/0246942 | A1 | 8/2018 | Chen et al. |
| 2018/0253676 | A1 | 9/2018 | Sheth et al. |
| 2018/0268253 | A1 | 9/2018 | Hoffman et al. |
| 2018/0307744 | A1 | 10/2018 | Gadekar et al. |
| 2018/0365309 | A1 | 12/2018 | Oliner et al. |
| 2019/0005025 | A1 | 1/2019 | Malabarba |
| 2019/0108274 | A1 | 4/2019 | DaBoll-Lavoie et al. |
| 2019/0220471 | A1 | 7/2019 | Toledo et al. |
| 2019/0250998 | A1 | 8/2019 | Bedadala et al. |
| 2019/0339950 | A1 | 11/2019 | Meyer et al. |
| 2020/0226156 | A1 | 7/2020 | Borra et al. |
| 2020/0250217 | A1 | 8/2020 | Abhyankar et al. |
| 2020/0250230 | A1 | 8/2020 | Abhyankar et al. |
| 2020/0250245 | A1 | 8/2020 | Abhyankar et al. |
| 2020/0252281 | A1 | 8/2020 | Abhyankar et al. |
| 2020/0301953 | A1 | 9/2020 | Abhyankar et al. |
| 2020/0410514 | A1 | 12/2020 | Livhits et al. |

OTHER PUBLICATIONS datanami.com [online], "Why Enterprise Knowledge Graphs Need Semantics," Oct. 2, 2017, retrieved on Feb. 27, 2020, retrieved from URL <https://www.datanami.com/2017/10/02/enterprise-knowledge-graphs-need-semantics/, 3 pages.

ir.microstrategy.com [online], "MicroStrategy Offers a Better Long-Term Solution for Enterprises Caught in Analytics Industry Upheaval," Jan. 11, 2019, retrieved on Feb. 27, 2020, retrieved from URL <https://ir.microstrategy.com/news-releases/news-release-details/microstrategy-offers-better-long-term-solution-enterprises>, 5 pages.

microstrategy.com [online], "2020 Enterprise Analytics Trends: The Semantic Graph Becomes Paramount to Delivering Business Value," Dec. 12, 2019, retrieved on Feb. 27, 2020, retrieved from URL <https://www.microstrategy.com/us/resources/blog/bi-trends/2020-enterprise-analytics-trends-the-semantic-graph-becomes-paramount-to-delivering-business-value>, 7 pages.

microstrategy.com [online], "A Semantic Graph Unlocks HyperIntelligence," Nov. 20, 2019, retrieved, on Feb. 27, 2020, retrieved from URL <https://www.microstrategy.com/us/resources/blog/bi-trends/a-semantic-graph-unlocks-hyperintelligence>, 9 pages.

microstrategy.com [online], "MicroStrategy 2019: Built for Breakthroughs," Jan. 7, 2019, retrieved on Feb. 27, 2020, retrieved from URL <https://www.microstrategy.com/us/resources/blog/news-and-events/microstrategy-2019-built-for-breakthroughs, 8 pages.

microstrategy.com [online], "'The Enterprise Semantic Graph" Feb. 13, 2019, retrieved on Feb. 27, 2020, retrieved from URL <https://www.microstrategy.com/getmedia/aad9b4a-a0fe-4247-8ae5-477c0efb4458/Published-World-2019-Enterprise-Semantic-Graph>, 21 pages.

microstrategy.com [online], "The Enterprise Semantic Graph: Laying the Foundation for Revolutionary Applications," Jan. 15, 2019, retrieved on Feb. 27, 2020, retrieved from URL <https://www.microstrategy.com/us/resources/blog/bi-trends/the-enterprise-semantic-graph-laying-the-foundation-for-revolutionary-applications>, 7 pages.

prnewswire.com [online], "MicroStrategy 2019, the World's Most Advanced Analytics & Mobility Platform, Powers Decisions for Every Moment of the Day," Jan. 10, 2019, retrieved on Feb. 27, 2020, retrieved from URL <https://www.prnewswire.com/in/news-releases/microstrategy-2019-the-world-s-most-advanced-analytics-amp-mobility-platform-powers-decisions-for-every-moment-of-the-day-867142447.html, 10 pages.

wikipedia.com[online], "Draft: Semantic Graph" Nov. 9, 2018, retrieved on Nov. 15, 2018, retrieved from URL <https://en.wikipedia.org/w/index.php?title=Draft:Semantic_Graph&oldid=868720195>, 5 pages.

U.S. Office Action in U.S. Appl. No. 16/677,183, dated Apr. 21, 2021, 21 pages.

U.S. Office Action in U.S. Appl. No. 16/677,183, dated Nov. 4, 2020, 17 pages.

U.S. Office Action in U.S. Appl. No. 16/589,053, dated Mar. 2, 2022, 20 pages.

U.S. Office Action in U.S. Appl. No. 16/450,673, dated Sep. 22, 2021, 21 pages.

U.S. Office Action in U.S. Appl. No. 16/677,183, dated Sep. 10, 2021, 26 pages.

U.S. Office Action in U.S. Appl. No. 16/677,427, dated Nov. 5, 2021, 30 pages.

U.S. Office Action in U.S. Appl. No. 16/450,673, dated Jan. 13, 2022, 15 pages.

(56) References Cited

OTHER PUBLICATIONS

U.S. Office Action in U.S. Appl. No. 16/514,946, dated Jan. 5, 2022, 13 pages.
Office Action in U.S. Appl. No. 16/450,673, dated Jun. 8, 2022, 15 pages.
Office Action in U.S. Appl. No. 16/677,183, dated May 4, 2022, 31 pages.
Office Action in U.S. Appl. No. 16/677,427, dated May 5, 2022, 37 pages.
Office Action in U.S. Appl. No. 16/514,946, dated Aug. 26, 2022, 15 pages.
Office Action in U.S. Appl. No. 16/677,183, dated Nov. 9, 2022, 25 pages.
Office Action in U.S. Appl. No. 16/677,427, dated Oct. 18, 2022, 46 pages.

\* cited by examiner

| Object Data | | | Usage Data | | | | | |
|---|---|---|---|---|---|---|---|---|
| Object ID | Object Type | User ID | Action | Time | Application | Location | Task/User Request | Nearby Users |
| 2856 | Document | 123 | Save | 12/13/2018, 3:32pm | Library | Santa Clara, CA | Save to Library | |
| 8573 | Metric | 124 | Share | 12/13/2018, 3:32pm | Dashboard Generator | Washington, DC | Open Dashboard | 234 |
| 1093 | Data Cube | 265 | Open | 12/13/2018, 3:32pm | Dashboard Generator | Room 5A, 123 Main St., ... | Load Data Set | 432, 244 |
| 3847 | Report | 247 | Generate | 12/13/2018, 3:32pm | Report Creator | GPS coordinates [...] | Scheduled Task | |
| 9862 | Column | 123 | Access | 12/13/2018, 3:32pm | Report Creator | | Generate Report | 133 |
| 4872 | Line Graph | 345 | Generate | 12/13/2018, 3:32pm | Report Creator | New York, NY | Display Report | |
| 3887 | Document | 214 | Retrieve | 12/13/2018, 3:32pm | Report Creator | | Open Document | 544, 554 |
| 7563 | Prompt | 213 | Generate | 12/13/2018, 3:32pm | Dashboard Generator | Chicago, IL | Export Document | |
| 1043 | Synonym | 6574 | Retrieve | 12/13/2018, 3:32pm | E-mail Client | | Check Document | |
| 2387 | Attribute | 214 | Retrieve | 12/13/2018, 3:32pm | Presentation Generator | | Insert into Document | |
| ... | ... | | | | | ... | | ... |

CONTEXT-BASED CUSTOMIZATION USING SEMANTIC GRAPH DATA

CROSS-REFERENCE TO RELATED APPLICATION

This application claims the benefit of U.S. Provisional Patent Application No. 62/801,290, filed on Feb. 5, 2019, the entirety of which is incorporated by reference herein.

BACKGROUND

The present specification relates to providing context-based customization of computing devices and systems using semantic graph data.

SUMMARY

In some implementations, a computing system stores semantic graph data indicating objects and relationships among the objects. The system also stores usage information associated with objects represented in the semantic graph. The usage information can be stored at a fine-grained level to indicate various contextual factors associated with actions taken using business analytics information. For example, usage data can be generated and stored on a user-specific basis, and for individual access actions in the system. The usage data can identify accessed data elements or other objects (e.g., documents, document components, data sources, database records, entity metrics, etc.), as well as the context of the access (e.g., a user identity, a user role, user permissions, an applicable task or workflow, a pattern of accesses, an application used, etc.). A wide variety of types of usage can be tracked and stored in usage data, including actions to retrieve, generate, edit, save, share, and so on.

The system associates the accesses with the semantic graph and uses the context-based usage data to adjust the weights for connections between objects represented in the semantic graph. The usage data is also used to customize or personalize output of the computing system, so that when the semantic graph is queried to perform an action (e.g., to generate a recommendation, suggestion, prediction, etc.), the output is customized due to the current context of the user and the respective contexts associated with prior usage by the user and other users. For example, the weights in the semantic graph may be dynamically adjusted using a customized aggregation or weighting of the context data according to the similarity of the user's current context with the contexts of prior usage actions. In this manner, different users can have different customized weightings for the same objects and connections based on the usage history of the objects represented in the semantic graph and the respective contexts of the users of the system.

In one general aspect, a method performed by one or more computers includes: storing, by the one or more computers, semantic graph data indicating objects and relationships among the objects; generating, by the one or more computers, usage data indicating (i) usage of the objects and (ii) contexts in which the objects are used; receiving, by the one or more computers, a request associated with a user and data indicating a context associated with the request; determining, by the one or more computers, customized weights for connections among the objects based on (i) the usage of the objects indicated by the usage data and (ii) similarity scores indicating a degree of similarity between the contexts indicated by the usage data and the context associated with the request; and providing, by the one or more computers, a response to the request that is determined based on the customized weights for the connections among the objects indicated by the semantic graph data.

Implementations can include one or more of the following features. For example, in some implementations, the request is a query, and the response to the request includes one or more search results responsive to the query. The one or more search results are selected or ranked based on the customized weights for the connections.

In some implementations, the request is a request for at least one of a recommendation, a suggestion, or a prediction determined using a semantic graph.

In some implementations, the response includes at least one of a search result, a metric, an attribute, an entity name, a data source, a document, a dashboard, or a visualization.

In some implementations, the usage data indicates multiple accesses to a first object associated with different contexts, and wherein determining the customized weights includes adjusting weights of connections to the first object according to a similarity of the different contexts to the context associated with the request.

In some implementations, determining the customized weights includes: determining an adjustment for a first weight indicated by the semantic graph data for a connection between a first object and a second object, the adjustment being based on one or more similarity scores indicating a degree of similarity between a context for a previous access to the first object and the context associated with the request; and applying the adjustment to the first weight to determine a customized weight for the connection between the first object and the second object.

In some implementations, the adjustment is a scaling factor or an additive offset.

In some implementations, determining the customized weights includes: determining a subset of the usage data indicating use of a first object associated with a context having a similarity with the context associated with the request that satisfies a threshold; and determining a customized weight for a connection with the first object based on the subset of the usage data.

In some implementations, determining the customized weights includes determining a customized weight for a connection between a first object and a second object based on a weighted combination of uses of the first object, and the uses of the first object are weighted according to the respective similarity of the contexts of the uses and the context associated with the request.

In some implementations, determining the customized weights includes determining a customized weight for a connection between a first object and a second object based on a weighted combination of different usage measures of the first object, the different usage measures each representing different groups of uses of the first object.

In some implementations, the different groups of uses comprise groups of multiple instances of use of the first object, the groups respectively representing uses associated with different users, different user roles, different organizations, different departments, different locations, different time ranges, different types of access, and/or different devices.

In some implementations, determining the customized weights includes determining a customized weight for a connection of a first object and a second object that includes multiple adjustments based on multiple different contextual factors.

In some implementations, the context associated with the request and the contexts associated with the usage data each indicate at least one of a user identity, a time, a location, a topic, a keyword, a task, an application, a person, a type of access, a type of device of device, a mode of accessed, a user role, a department, or an organization.

In some implementations, the context associated with the request indicates characteristics of a logical or physical environment of a device that submitted the request.

In some implementations, generating the usage data includes tracking multiple types of actions involving the objects, the actions including at least one of requesting, serving, reading, writing, saving, printing, sharing, or selecting the objects.

In some implementations, the objects comprise objects representing at least one of attributes, measures, metrics, groups, filters, prompts, locations, dates, times, synonyms, user identities, data sources, data sets, database elements, visualizations, terms, addresses, documents, reports, dashboards, tables, visualizations, or information cards.

In some implementations, determining the customized weights for the connections among the objects includes determining user-specific weights for the connections, the user-specific weights being based at least in part on (i) prior actions of the user with respect to the objects and/or (ii) aggregations of usage data of multiple users determined based on characteristics of the user or prior actions of the user.

In some implementations, the semantic graph data indicates connections among the objects that represent different types of relationships among the objects, and the different types of relationships include at least one of a dependency of an object on another object, a co-occurrence of an object with another object, an object being an instance of a class or category represented by another object, an object being a part of another object, or an object using or accessing another object.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 3 is a table illustrating an example of context-based usage data.

Like reference numbers and designations in the various drawings indicate like elements.

DETAILED DESCRIPTION

Figure 1:
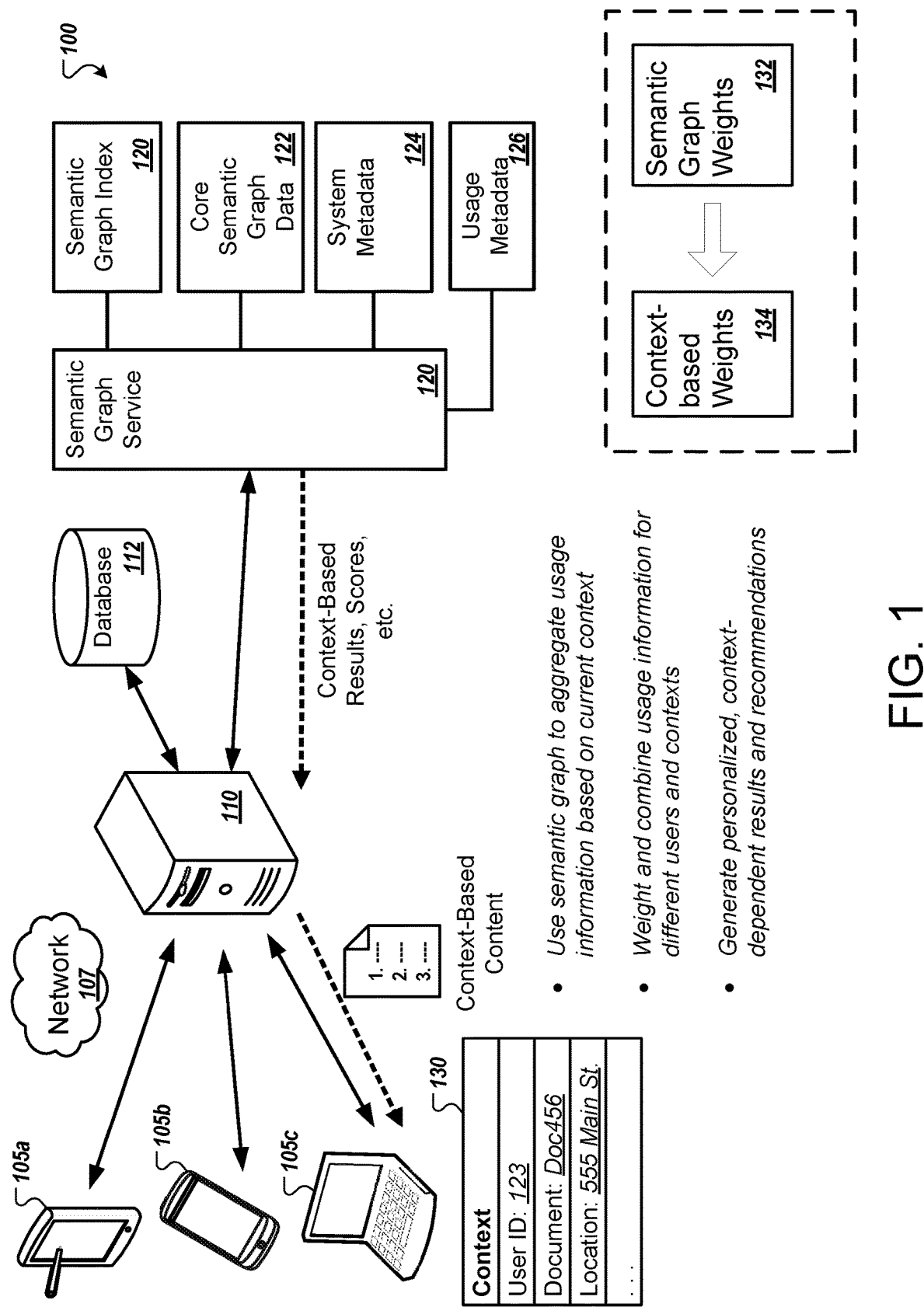
FIG. 1 is a diagram showing an example of a system for context-based customization using semantic graph data.

FIG. 1 is a diagram showing an example of a system 100 for context-based customization using semantic graph data.

In general, semantic information can be used by many types of enterprise systems, such as database systems, online analytical processing (OLAP) systems, search engines, and others. Traditionally, semantic data is used to translate database table and other data formats into human-readable forms. Semantic data can provide information about the identity of objects, the meaning of different objects, relationships among objects, and so on. For example, semantic information may indicate that a particular column of data represents a particular attribute or metric and may indicate the data type of the data. Semantic data that indicates the categories or types of objects is useful, but labels and classifications alone typically do not indicate the full scope of the complex interactions, relationships, and histories among objects.

In general, the semantic graph provides an ability to better provide personalized, contextualized information from what otherwise may be a sea of static and flat data without the semantic graph and associated metadata. A semantic graph can indicate enhanced relationships between objects. For example, the semantic graph can include different weights for connections between objects, and the values of the weights can vary dynamically over time. In addition, the semantic graph may indicate multiple different types of connections between objects, as well as specifying directionality of the connections.

The semantic graph and associated metadata can be used to automatically generate personalized recommendations and content to end users, for example, based on the identity of the user and the user's current context. The semantic graph can be used to associate objects with telemetry information, such as usage information that indicates how objects are used, how often objects are used, who the objects are used by, and so on. The relationships modeled with the semantic graph can be varied and complex. Even for only two objects, there may be a multi-dimensional connection between them with different weights representing strengths of different relationships or properties. In this sense, there may be multiple connections between objects representing different types of relationships or different aspects of a relationship (e.g., one weight for co-occurrence frequency in documents, another weight for a degree that one object defines the meaning of the other, another weight for how commonly objects are accessed by the same users, and so on). The weights for the connections dynamically adjusted over time. With this information, applications can better identify which objects out of a large set (e.g., hundreds, thousands, millions, or more) are most important and most related to each other.

Many different types of objects can be identified and characterized using the semantic graph. For example, objects may represent data sources, data cubes, data tables, data columns, data fields, labels, users, locations, organizations, products, metrics, attributes, documents, visualizations (e.g., charts, graphs, tables, etc.), and many other data items or concepts.

Usage information can be stored for each object, as well as for each user. The semantic graph may be interpreted differently for each user. For example, the user context (e.g., the identity, permissions, and usage history for the current user) can provide a personalized lens to interpret the data. User information can be used to adjust the weights in the semantic graph to alter search results, recommendations, application behavior, and other aspects of the user's experience. As discussed below, other types of context can also be captured and stored, such as data indicating a user's geographic location, the identity of a user's device, a device type or capabilities of the user's device, a time of day, an identity of another user or device nearby, an application open on the user's device, text on a user interface, a current task or workflow, keywords of recent queries or recently viewed documents, and so on.

The semantic graph can also indicate weights for levels of security, access restrictions, and trust for objects. For example, the semantic graph data can indicate the status of certain objects being certified or not, as well as the level of certification and the authority that provided the certification. Certified content is often more useful than content that is not certified, and so application content can give higher weight or higher preference to certified content. In general, the connections and weights for the semantic graph can indicate higher weights for higher-quality content.

The semantic graph provides a framework to integrate various different types of data from different sources, e.g., presence data indicating locations of users, access control data indicating user privileges, real-time application context, user interaction histories, query logs, and so on. Further, the relationships between objects are not limited to a particular use or domain. For example, the usage information and history that is generated from user-submitted search queries and responses can affect the weights between objects used for much more than carrying out searches, e.g., also for personalizing an interface for document authoring, for system performance tuning, for recommending documents, and more.

The semantic graph, through the various associated weights for connections between objects, provides a very useful way for a system to understand the relative weights between objects. In many cases, the meanings of different items and their relative importance is revealed over time through usage information, such as the frequency with which that users use certain objects together in document or a particular visualization. The overall amount of use of different objects (e.g., number of accesses over a period of time) is also a strong signal that can be used to rank objects relative to each other.

As users interact with an enterprise platform, they contribute information and meaning to the semantic graph. As an example, a database may have a column labeled "EFTID," and the user may know that values in the column represent a unique customer unique ID. The system obtains new information about the meaning of the column as the user interacts with the data, for example, by renaming the column, referencing the data in a visualization, using the data in an aggregation or along an axis, etc. The understanding and context that the user has (e.g., by understanding the meaning of the data) can be at least partially revealed to the system through the user's use of the data over time. The system uses the usage data to capture these indications of meaning and feeds them back into the graph, e.g., through adjusting connections between objects and adjusting weights for connections. A number of contextual cues from user actions can be identified by the system and used to update the semantic graph and optimize the operation of the system.

Information in the semantic graph and associated metadata can be stored on a user-by-user basis and/or at other levels of aggregation (e.g., by user type, by organization, by department, by role, by geographical area, etc.). Usage information is often stored on a per-user basis to indicate the particular actions users take and items viewed. Users can also be grouped together and their respective usage information aggregated. For example, users may have data in the semantic graph indicating their attributes, such as their organization, department, role, geographical area, etc. The system then uses that information to determine the overall usage patterns for a group of users. For example, to determine usage patterns for users in a particular department, the system can identify user objects in the semantic graph that have a connection of a certain type (e.g., a "member of" connection) to the particular department. With this set of users, the system dynamically combines the sets of usage data for the individual users identified. In this manner, the system can aggregate usage logs, system performance data, and other information at any appropriate level as needed.

In the example of FIG. 1, a server system 110 provides analytics functions to various client device 105a-105c. The analytics functions can include serving documents, answering database queries, supporting web applications, generating documents (e.g., reports, dashboards, etc.), and so on. The server system 110 can include one or more computers, some of which may be remotely located or provided using a cloud computing platform. The server system communicates with the client devices 105a-105c through a network 107.

The server system 110 has access to a database 112 that stores data that is used to provide the analytics functions. For example, the database 112 may store documents, data sets (e.g., databases, data cubes, spreadsheets, etc.), templates, and other data used in supporting one or more analytics applications.

The server system 110 stores data for a semantic graph, which can include, among other data, a semantic graph index 120, core semantic graph data 122 (e.g., including object definitions, semantic tags, identifiers for objects and connections, etc.), system metadata 124, and usage metadata 126.

The system may be arranged to provide access to the semantic graph through a semantic graph service 120. For example, the system may provide an application programming interface (API) allowing software modules to look up different information from the semantic graph. The semantic graph and associated metadata can be stored in various formats. As an example, a core set of structured metadata identifying objects and their properties can be stored in a database. Additional associated data can be stored in the same manner or at other locations. For example, a high-speed storage system can store and update usage metadata, system metadata, and other types of information that are constantly being updated to reflect new interactions. This metadata can be associated or linked to the core structured metadata for the objects by referencing objects through the identifiers or other references defined in the core semantic graph structured metadata. The semantic graph service 120 may then provide information to influence various other functions of the enterprise system, such as a search engine, a content recommendation engine, a security or access control engine, and so on. Although the storage of the semantic graph data and associated metadata may be stored at diverse storage locations and across different storage systems, the semantic graph service 120 provides a unified interface for information to be delivered. Thus, the service 120 can provide access to diverse types of data associated with the semantic graph through a single interface. The semantic graph service 120 can provide a consistently available, on-demand interface for applications to access the rich interconnectedness of data in an enterprise system.

As an example, a query response engine can submit a request to the semantic graph service 120 that indicates a certain context. The context information may indicate, for example, user context (e.g., a user identifier), location context (e.g., GPS coordinates or a city of the user), application context (e.g., a document being viewed), or other contextual factors. In some cases, the request indicates one or more context objects (e.g., user objects, location objects, document objects, etc.) and the semantic graph service 120 provides a list of the related objects and scores of how relevant the results are to the context objects. If a recommendation engine submits a request for results of a certain type (e.g., documents, media, etc.) given a certain context, the semantic graph can provide results that identify objects selected based at least in part on the particular usage history and other data associated with the context. The semantic graph service 120 may use both general weights and usage information, e.g., across all users, as well as specific weights and usage information tailored to the context. For example, all using data may be used to define a general weight that is used for a connection in the semantic graph when no specific context is specified. When a user context is specified, the general weight may be adjusted based on user-specific usage data and weightings. Thus the results from the semantic graph service 120 can blend general and context-specific information when appropriate. Of course, if specified in a request or for certain types of requests, responses for a context may be generated using only metadata relating to the context in some implementations.

Referring still to FIG. 1, the server system 110 can use the semantic graph to aggregate usage information based on the current context of a user. The server system 110 (or another computer system providing the semantic graph service 120) can weight and combine usage information for different users and contexts. The result is a set of context based results and scores that the server system 110 can use to generate personalized context-dependent results and recommendations.

For example, semantic graph data 122 can be stored indicating objects relationships among the objects. As the devices 105a-105c interact with the server system 110, usage metadata 126 is generated. The usage metadata 126 can indicate levels of usage of the objects indicated by the semantic graph data 122, for example, by including a log of individual usage actions. The usage metadata 126 indicates the contexts in which the objects are used, e.g., a set of context information to describe the context in which each action occurred.

The server system 110 or another system can provide a query associated with a user. In the example of FIG. 1, the query relates to a user of client device 105c. The query can indicate a context of the user, illustrated as context data 130. The query may represent a request for recommended objects, potentially of a particular type such as a request for recommended reports given the current context, a request for relevant users given the current context, a request for data sources given the current context, etc. The query may include query terms, such as a user question or keywords, or may not.

A customized weighting of connections among the objects in the semantic graph is then determined, based on (i) the levels of usage indicated by the usage data 126 and (ii) scores indicating a degree of similarity between the contexts indicated by the usage data and the context of the user indicated by context data 130. For example, usage statistics for different objects can be aggregated according to the context of the user. For a particular object in the social network, the system can determine how frequently the current user accessed the particular object, how frequently other users accessed the particular object, how frequently the current user or other users accessed objects of the same topic or type as the particular object, and so on. For each set of accesses involving the particular object, the system can weight usage measures based on the level of similarity between the current context of the user and the respective contexts for the accesses indicated by the usage data. As a very simple example, if there are five contextual factors considered by the system, a count of accesses matching all five factors may be multiplied by a weight of 1.0, where counts of accesses that have only four, three, two, or zero contextual factors in common may be weighted 0.8, 0.6, 0.4, 0.2, and 0.0.

In some implementations, determining the custom weightings can start with general semantic graph weights 132 that are not context-specific. These weights may represent, for example, an aggregate measure of the strength of relationships between objects across all usage data collected. From this set of data, the system may select a subset of the usage metadata 126 that is particular relevant to the query, such as usage involving the same user associated with the query, or usage involving a topic or object type of the query. The system then compares the contexts of the usage instances indicated in the subset with the context of the current user and can adjust the general semantic graph weights 132 to generate context-based weights 134. For example, the original weights may be multiplied by a custom multiplier, have an additional term added or subtracted, or otherwise be adjusted. The semantic graph service 120 uses the context-based weights 134 to generate a response to the query, which is provided to the server system 110. The response may identify objects stored in the database 112 and may include scores for or a ranking of objects, as well a potentially other information (e.g., semantic tags or labels, associated keywords, object type definitions, object attributes, etc.)

The server system 110 uses the response from the semantic graph service 110 to generate and provide content to the client device 105c. For example, when preparing search results to a user query, the server system 110 may process the information from the semantic graph service and use it to select or rank search results to provide to the user's client device 105c. As another example, the server system 110 may provide recommendations of objects, such as documents to view, attributes to include in a document being edited, visualizations that may be of interest for the current data set, and so on.

Figure 2:
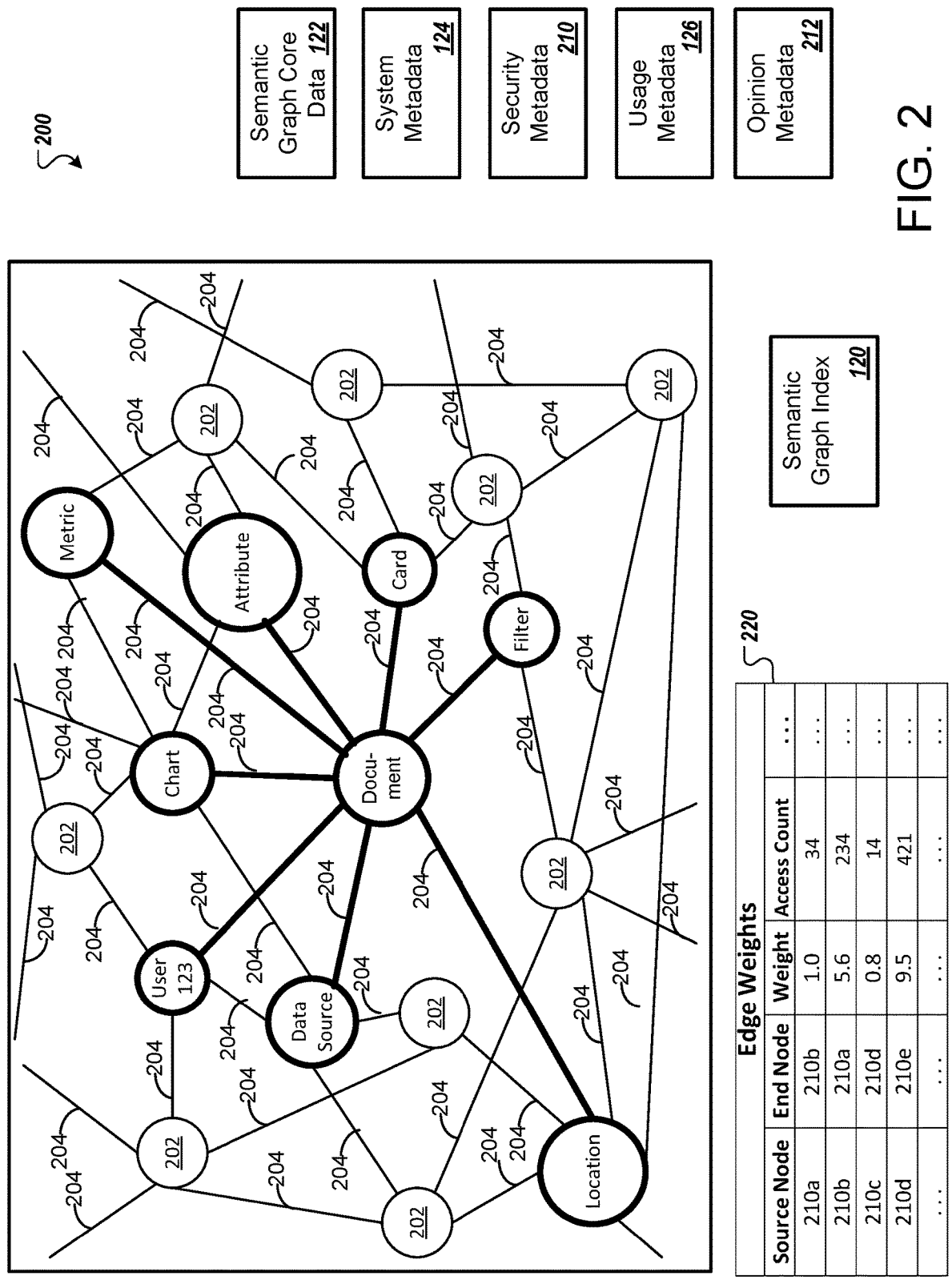
FIG. 2 is a diagram showing an illustration of a semantic graph.

FIG. 2 illustrates an example illustration of a semantic graph 200. Objects are illustrated as nodes 202 and relationships or connections between the objects are illustrated as edges 204. Each node 202 can have a variety of information stored to describe the object it represents, e.g., an object type for the object, a location of the object (e.g., in a file system), an identifier for the object, attributes for the object, etc. The nodes 202 and edges 204 that identify the objects and their connections may be stored in the semantic graph core data 122, along with definitions, semantic tags, and more.

The edges 204 have weights 220 associated with them, e.g., values indicating magnitudes or strengths of the respective connections. Other information indicating the nature or character of the edges 204 can also be stored. Although the illustration only shows one edge 204 between each pair of nodes, there may be multiple different relationships between two objects, which may be represented as, for example, multiple edges 204 with different weights or an edge with multiple dimensions or aspects. In some implementations, an edge 204 and an associated weight represents an overall affinity of objects. In some implementations, Different edges 204 may represent different types of relationships, e.g., dependency (e.g., such as a document requiring data from a data source), co-occurrence, an object being an instance of a class or category, an object being a part of another object, and so on. Edges 204 may be directional. For example, the weight or strength of connection from Object A to Object B may be greater than the weight from Object B to Object A.

The semantic graph 200 has various types of metadata that describe aspects of the objects and connections. The system metadata 124 can indicate the configuration of the system and performance measures. This metadata can be generated and stored for each device or module of an enterprise system, e.g., client devices, content servers, database servers, individual applications, etc. The usage metadata 126 can include records of the accesses made throughout the system to any of the objects represented in the semantic graph 200, as well as the nature or type of access. Security metadata 210 can indicate security policies, permissions and restrictions, histories of security decisions (e.g., to grant or deny access) and so on. The Opinion metadata 212 can indicate explicit or inferred opinions and preferences of users. For example, the opinion metadata 212 can store information about sentiment derived from user actions or user documents, preferences for some items over others, and so on. These types of metadata and others can be associated to identifiers for specific nodes 202 and connections 204, allowing the semantic graph to store information about specific instances of how nodes 202 and connections 204 were accessed.

The system metadata 124, usage metadata 126, and other types of metadata can be log files that show historical information about how an enterprise system operated and how it was used. In some implementations, the metadata is received as real-time or near-real-time telemetry that is measured, logged, and reported as transactions occur. For example, the metadata can collect and store a stream or feed of information from client devices, databases, query processing modules, web servers, and any other component of the enterprise system. Thus, the information can be used to detect performance limitations or emerging trends in usage as they occur and with a very fine-grained level of precision. The telemetry can indicate individual requests, transactions, and operations. In some implementations, some aggregate measures can also be provided, such as an overall load level of a device.

As discussed above, a semantic graph can be a logical layer of software that describes information stored in data systems using human-readable terms and provides metadata that can aid analysis of the data. One of the primary functions is to provide people with way to query databases using common business terms without having to understand the underlying structure of the data model.

A semantic graph can store or have associated with it (i) metadata describing the data in human-understandable terms along with (ii) usage data about how often the data is accessed, by whom, and relationship data about how objects are used together in analysis scenarios. There are a number of objects and metadata that may be stored as part of a semantic graph implementation: data objects, content objects, user objects, usage metadata, security metadata, system metadata, a semantic graph index, opinion metadata, and action objects.

Different vendors often different terminology for similar concepts. For example, a "dimension" or "attribute" for a data object may both represent the same or similar concept, e.g., a value that represents a property of a data object. Similarly, a "measure" or "metric" in a data set may both refer to the same or similar concept, e.g., a value that provides quantitative indicator, such as a result of a calculation or function.

Data objects in the semantic graph can refer to objects that appear to users as business concepts. For example, "customers", "products", "revenue" and "profit" are all common data objects in the semantic graph. A user will typically see those data objects in a user interface and can query the underlying database by interacting with the data objects. For example, a user may query the database by requesting "customers" and "revenue". The system will then query the database (or in many cases, multiple databases) to fetch the customer revenue data. Querying the system usually requires a number of complex database calls using SQL, MDX or APIs. From a user perspective, however, the complexity of how the data is stored, and the sophisticated query required to retrieve the results are automatically handled on behalf of the user.

Common types of Data objects include dimensions, measures, groups and sets, hierarchical structures, filters and prompts, geographic objects, date and time objects, and synonym objects. Dimensions (Attributes)—Dimensions and Attributes both refer to data that is typically (but not always) a noun, such as "Customer", "Product", "Country", or "Account". Dimensions can also have additional metadata associated with them to qualify them further. For example, a Dimension object can have further metadata describing it as a Person, which can, in turn, have further metadata describing the Person as being of type Employee.

Measures (Metrics or Key Figures)—Measures and Metrics both refer to data that would typically be used for calculations such as "Revenue", "Profit", "Headcount", and "Account Balance". Measures can also have additional metadata further describing how the Measure behaves. For example, additional metadata can describe whether bigger values or smaller values are "good" or whether a Measure represents a "currency".

Groups and Sets—Groups and Sets refer to objects in the semantic graph that represent grouping of data elements. For example, the "Top 10 customers" may be a group that represents the top Customers by some measure (for example Revenue). Groups and Sets can be a simple grouping such as "My Customers=Company 1, Company 2, and Company 3" or a rules-based grouping such as "My Top Customers=top 10 Customers by Revenue for Year=2018".

Hierarchical structures—Hierarchical structures provide metadata about the relationship between objects and object values in a semantic graph. For example, one such hierarchical structure may describe a Parts hierarchy where certain products are made up of parts.

Filters and Prompts—Filter and prompt objects provide a means to define variables that need to be set either by the programmer, system or end user prior to execution of the object. For example, a semantic graph may have a "Region" filter or prompt whose value must be defined prior to executing the query or content object that it is associated with.

Geographic objects—Geographic objects are objects associated with geographic concepts such as countries, regions, cities, latitude and longitude. Geographic metadata helps the consuming user or system map or perform geospatial calculations using the objects much more easily.

Date and Time objects—Date and Time objects are a special classification of objects that are associated with Dates and Times. This can be used for time based calculations (year over year analysis) or for displaying the object data on Date and Time-based output such as calendars.

Synonym objects—Synonym objects are a special classification of dimension and attribute objects that store alternate values to the values in the dimension objects. This is useful in cases where there are multiple common terms that are used to map to a specific value in the database. For example, in common usage, Coke and Coca-Cola are often used interchangeably when searching for information. The Synonym object stores such alternate values and maps them to a common value in the database.

Content objects in the semantic graph refer to content that is typically displayed to end users as an assembly of data objects. Content objects include:

Reports—Report objects are highly formatted, sectioned and paginated output such as invoices, multi-page tables and visualizations.

Dashboards—Dashboards objects are similar to Report objects in that they also display data and have formatting and visualizations. Dashboards differ from Reports in that they tend have summary data and key performance indicators instead of detailed pages of information.

Tables and Grids—Tables and grids represent data in tabular format (with rows and columns). Tables and grid often are included in Reports and Dashboards.

Visualizations—Visualization objects illustrate data in charts such as bar, pie and line charts.

Cards—Card objects store the key information for a specific topic and are built to augment and overlay third party applications with analytic information in the context of the user.

User objects are people, groups and organizations that are represented in the semantic graph. These objects represent user accounts and groups of user accounts and are used to provide system access, security and rights to other objects in a semantic graph. Users are particularly important in the semantic graph because they are the actors in the system that create, interact with, and use the other objects in the semantic graph. A semantic graph provides an understanding of the relationship between users and the objects in the semantic graph as well as the relationships between the users themselves.

Usage metadata is information stored in a semantic graph about the usage of the objects in a semantic graph. This additional usage data provides information about which objects are used by which users, which objects are used together and which objects are the most and least popular in the system. Usage metadata also contains the context of the user when she interacted with the system. For example, what type of device she was using, where she was, and what data context she was in. This usage metadata, in addition to the other metadata in a semantic graph, provides a means to find relevant information for different users and usage context. Usage metadata is the primary differentiator between a semantic layer and a semantic graph. While a semantic layer primarily describes data in business terms and provides relationship information between the objects as a means to map these business terms to database queries, a semantic graph stores usage information to provide additional information about the weight of the relationships between objects in the semantic graph. Usage metadata can also contain information about when and where objects are accessed.

Security metadata is information stored in a semantic graph about which users have access to which objects, which privileges they have on the objects, and which data they have access to. The Security metadata can also contain special concepts such as whether the objects are certified, contain personally identifiable information or contain sensitive information.

System metadata is data about how the objects in the system perform. This can include system information such as error rates and run times for the objects. This information can be used by users and system processes to optimize performance of the system. For example, the system can automatically notify content authors if their content is experiencing slow load times or high error rates. The system can also use the system metadata in the semantic graph to automatically perform maintenance to improve performance of content. For example, if a content object has slow performance and there are many users that access that content on a predictable basis, the system could potentially automatically schedule execution of the content and cache the results so as to provide users with improved performance.

A semantic graph index indexes key values in the semantic graph so as to provide fast search and retrieval times. These key values may be a variety of types of information, such as keywords, semantic tags, object or node identifiers, connection or edge identifiers, and so on.

Opinion metadata is opinion information about the objects in a semantic graph that is provided by the end users. For example, users could give a 'thumbs up' or 'favorite' content to indicate that they like or find it useful. Other mechanisms such as a star system or commentary can also be employed as means of storing opinion metadata in a semantic graph. Opinion metadata is useful alongside usage metadata and affinity between objects to help find content that is both relevant to the user's context and of value based on opinion.

Action objects describe actions that can be taken on other objects in a semantic graph. For example, there may be an Action object that takes a Date and Time object and converts it from one format (24 hour) to another (12 hour).

A semantic graph can provide a number of benefits. For example, a primary goal of the semantic graph is to make access to complex business data systems easy for people without database or programming skills. The semantic graph can provide common naming and semantics to represent complex data models with otherwise obscure or non-human-readable names. The semantic graph can provide or support various services built atop it (for example, search or machine-learning-driven recommendation services) with metadata, relationships, and user-based context information that can help answer user questions and recommend the most relevant content to users. The semantic graph can include (or have associated with it) security and audit information to help secure data assets based on user security access profiles.

FIG. 3 is a table 300 illustrating an example of usage data. The example shows records of individual actions or transactions within an enterprise system. Each row represents an instance in which an object was used.

The object data indicates, for example, an object identifier and an object type for each object.

The usage data indicates the context and nature of the use, such as the user identifier for a user associated with the action, the type of action performed, the time of day, the location of a user initiating the action, an indication of a broader task or workflow (such as fulfilling a type of user-initiated action or request) that the action is part of, an indication of nearby users, and so on.

With usage data such as the kind shown in the table 300, an enterprise system can aggregate the data in various ways, and then use the aggregated data to generate customized recommendations, search results, predictions, user interfaces, and other outputs. For example, to respond to a user's search query, the system can use the semantic graph data to identify objects of a particular type or those associated with certain keywords or attributes. Then, for each of the identified objects, the system can then aggregate the usage data for the object. This can include a weighted combination of usage measures, for example, one that weights more highly the instances of use by the current user but still takes into account usage by other users. The weighting can take into account the similarity between the current context of the user and the context of prior uses, with higher similarity resulting in higher influence in the combined score. In addition, a weighted combination can also include components reflecting levels of use of other similar objects and actions, such as an aggregation of usage measures among other objects of the same type or other objects hosted by the same server.

With aggregated usage measures, the system can generate custom weightings for connections between objects. These custom weightings can be adjustments of the general edge weights of the semantic graph. Custom weightings can be determined for each request or transaction with the social network service, so that for each user and even for each different request involving the same user the weightings and thus outputs of the semantic graph service 120 may be different. The output of the semantic graph service 120 can include an identification of objects that are responsive to or relevant to the query it receives. An enterprise analytics system may then use the identification of objects to perform a number of actions, such as select search results (e.g., to a user's query to the analytics system), adjust the rank of search results, adjust a user interface (e.g., to select, rank, or arrange objects for view, such as to select items dynamically populated in a menu), provide recommended content, and more.

Figure 4:
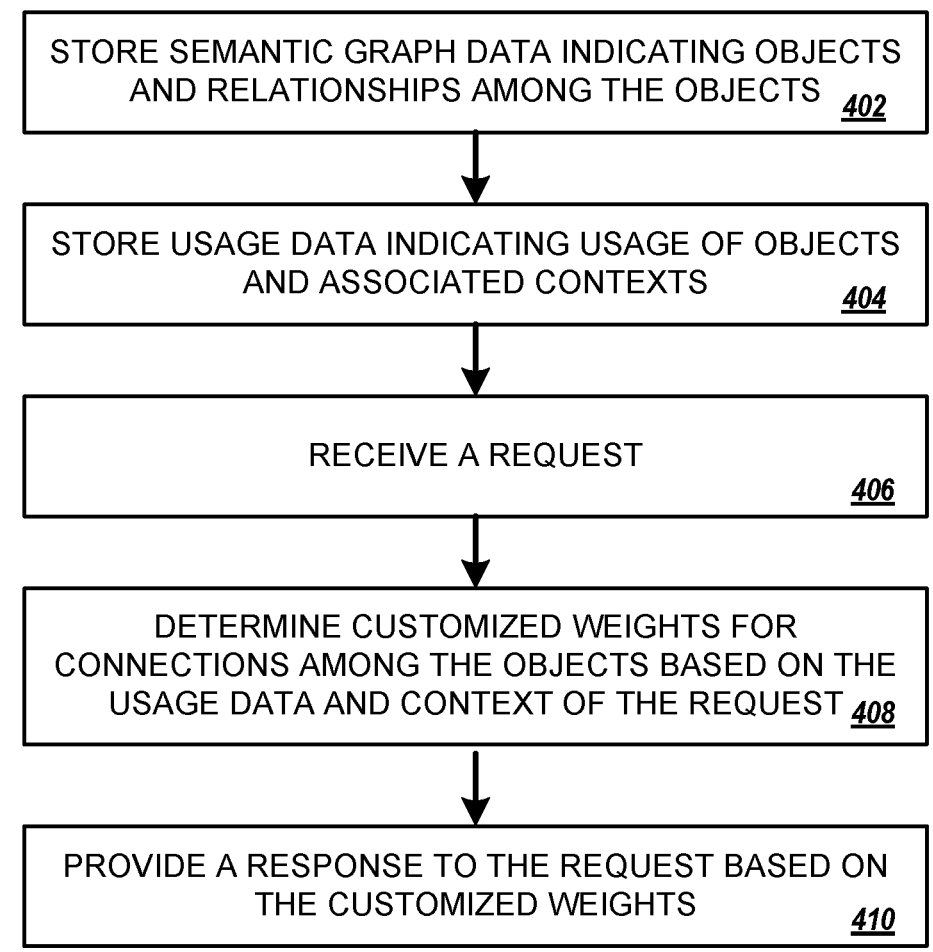
FIG. 4 is a flow diagram illustrating an example of a process for context-based customization using semantic graph data.

FIG. 4 is a flow diagram illustrating an example of a process 400 for context-based customization using semantic graph data. The process can be performed by one or more computers, e.g., a client device, a server system, or combinations of both.

The one or more computers store semantic graph data that indicates objects and relationships among the objects (402). As a few examples, the objects can include objects representing attributes, measures, metrics, groups, filters, prompts, locations, dates, times, synonyms, user identities, data sources, data sets, database elements, visualizations, terms, addresses, documents, reports, dashboards, tables, visualizations, and/or information cards.

The semantic graph data can indicate connections among the objects that represent different types of relationships among the objects. The different types of relationships include at least one of a dependency of an object on another object, a co-occurrence of an object with another object, an object being an instance of a class or category represented by another object, an object being a part of another object, or an object using or accessing another object.

The one or more computers store usage data indicating usage of the objects and contexts in which the objects are used (404). The objects can represent data objects (e.g., software objects, data values, data sources, etc.) and/or representations of physical objects (e.g., users, locations, etc.). Usage data may be generated by tracking multiple types of actions involving the objects, the actions including at least one of requesting, serving, reading, writing, saving, printing, sharing, or selecting the objects.

The one or more computers receive a request associated with a user (406). Data indicating a context associated with the request can also be received. As an example, the request may be a request for a document or other content. The request may be a query. As additional examples, the request may be a request for a recommendation, a suggestion, or a prediction determined using a semantic graph.

The context associated with the request can indicate characteristics of a logical or physical environment of a device that submitted the request. The context of uses of objects and the context for the request can indicate factors such as a user identity, a time, a location, a topic, a keyword, a task, an application, a person, a type of access, a type of device of device, a mode of accessed, a user role, a department, and/or an organization.

The one or more computers determine customized weights for connections among the objects (408). The customized weights can be based on (i) the usage of the objects indicated by the usage data and (ii) similarity scores indicating a degree of similarity between the contexts indicated by the usage data and the context associated with the request. Customized weights can be determined based on dynamically determined aggregations of the usage data, where the aggregations are determined according to the relationships in the semantic graph. The aggregated data can then be weighted and combined according to the similarity scores, so that objects with prior usage in the same or similar context as the request have their connections boosted, which can increase the ranking or likelihood of selection of objects to be provided in response to the request.

The customized weights can be user-specific weights for the connections. For example, the user-specific weights can be based at least in part on (i) prior actions of the user with respect to the objects and/or (ii) aggregations of usage data of multiple users determined based on characteristics of the user or prior actions of the user. In some implementations, the customized weights can be customized weights between objects in the semantic graph and a user object representing the user associated with the request. The customized weights can be have components or adjustments based on multiple different contextual factors, e.g., time, location, topic, prior use by the user, prior use by other users, types of uses, etc. Any or all of these factors can be used to determine similarity between the context of a prior use and the context of the current request, and thus the customized weight to use in responding to the request.

Various techniques can be used to determine the customized weights. One example is to determine adjustments for weights indicated by the semantic graph data. In some cases, the adjustment is a scaling factor or an additive offset. The adjustment can apply an increase or decrease to the strength of a connection. A general or overall connection weight can be adjusted based on one or more similarity scores indicating a degree of similarity between a context for a previous access to an object and the context associated with the request. For example, a semantic graph connection weight may have a scaling factor applied, where the scaling factor is based on a level of use indicated by the usage data and a similarity of contexts of the uses to the context of the request.

As another example, a customized aggregation of usage data can be determined, for example, an aggregation that represents a subset of usage data that is relevant to the context of the request. For example, a subset of the usage data can represent uses of a first object that are associated with a context having a similarity to the request's context that satisfies a threshold. A customized weight can be determined for a connection with the first object based on the subset of the usage data.

As another example, a customized weight can be based on a weighted combination of uses of an object, with uses of the first object each being weighted according to the similarity of the prior use context and the context associated with the current request. In some cases, rather than generate or weight individual instances of use, a weighted combination of different usage measures of the first object can be determined, with the different usage measures each representing different groups of uses of the first object. The different groups of uses can include groups of multiple instances of use of the first object, where the groups separate usage by user, by user role, by usage within individual organizations or departments, by location, by timer range, by type of access, and/or by device involved in the access.

The one or more computers provide a response to the request that is determined based on the customized weights (410). For example, the response may include at least one of a search result, a metric, an attribute, an entity name, a data source, a document, a dashboard, or a visualization. The usage data can indicate multiple accesses to a first object associated with different contexts, and wherein determining the customized weights includes adjusting weights of connections to the first object according to a similarity of the different contexts to the context associated with the request.

When responding to a query, one or more search results can be selected or ranked based on the customized weights for the connections. For example, the customized weights can be used to set or adjust an information retrieval score for an object. Usage data indicating prior usage of an object by the user or others can increase a relevance score for the object. The score can be based on a customized weight determined by aggregating weights of connections with the object, e.g., connections of user objects with the object indicating levels of use of the object by those users, or connections of objects associated with the user (e.g., objects representing topics, terms, locations, other documents, etc. that are associated with the user).

In some implementations, in determining the customized weights or other scores, the one or more computers aggregate a subset of the usage data (or scores representing the usage data) based on the semantic graph data. The usage data can be aggregated according to any of various different factors or dimensions. For example, a subset of usage data can be aggregated by user, by user group, by role, by department, by organization, by authentication level or privilege level, by client device, by server, by data object, by data object category, by operation, by operation type, by time period, and/or by geographic location. Aggregations can be made over combinations of these factors. As just a few examples, an aggregation may be performed for a specific user and application, for specific types of objects and specific devices (e.g., dashboards provided by a specific server), or for all client devices in a geographical area.

As an example, the one or more computers can aggregate the usage data for actions over a time period (e.g., an hour, a day, a week, etc.) for a particular client device. The one or more computers can use this subset of usage data to determine the customized weight for a connection between objects. For example, aggregated usage data representing types of uses of a first object and/or contexts of uses of the first object by various users can be used to generate an adjustment (e.g., a scaling factor, additive offset, etc.) to determine a customized weight between a particular user associated with a specific request.

For example, based on a similar context for the request and the contexts of prior uses of the first object, a connection weight for a connection between the user associated with the request and the first object can be increased. This dynamic adjustment, which can be used for a limited time and limited purpose such as for responding to the current request, can increase the likelihood that the first object is selected to be used in preparing a response to the request. Similar adjustments can be made throughout the semantic graph for other objects and connections (e.g., connections to the object representing the user associated with the request, connections among other devices and objects, etc.), based on other aggregations of usage data representing how those objects have been used. For example, the semantic graph service can use the customized weights for responding to the request associated with the user, and use different customized weights for requests associated with other users and other contexts.

As another example, the one or more computers can aggregate usage data for a particular document, using the semantic graph data to identify the subset of usage data that are associated with the object identifier for the document. This can show an overall view of how that document has been used across different client devices, servers, applications, locations, and so on.

In some implementations, the one or more computers use connections (e.g., edges) between nodes in the semantic graph to carry out the aggregation. For example, the one or more computers may aggregate the subset of usage data for a category of document, such as a dashboard. Based on a dashboard document type object, the one or more computers can use connections to other document objects, and so identify all objects of the dashboard type, and then select usage data for all documents connected to the dashboard document type object. As another option, nodes for objects may declare or otherwise indicate their type (e.g., with an object type identifier or code), and the one or more computers can identify the set of nodes having the dashboard type identifier and then aggregate the performance information for the identified set of nodes.

In determining the aggregations, the one or more computers may identify or select portions of the overall set of tracked usage data, e.g., portions that involve less than all of the available data. The aggregation may involve, but does not require, performing a function on the subset of records, e.g., to determine an average value (e.g., a mean, median, mode, etc.), a maximum value, a minimum value, to combine various usage data (e.g., in a weighted combination), or to determine a count or total based on the subset.

In some implementations, the data is aggregated according to contextual factors. For example, one or more of time, location, user identity, device identity, or other factors can be used. For example, the one or more computers can aggregate information that occurs in a particular context, which might be defined as, e.g., during business hours at a specific office location.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:

storing, by the one or more computers, semantic graph data indicating objects and relationships among the objects;

generating, by the one or more computers, usage data indicating (i) instances of usage of the objects by multiple users and (ii) contexts in which the objects have been used by the multiple users;

receiving, by the one or more computers, (i) a request associated with a user and (ii) context data indicating a context of the user associated with the request;

in response to receiving the request, determining, by the one or more computers, customized weights for connections among the objects, wherein the customized weights are customized for the user and are based on accesses of the multiple users to the objects, wherein the customized weights are determined by:

determining similarity scores each indicating a degree of similarity between a different one of the contexts indicated by the usage data and the context associated with the request; and generating each of the customized weights based on a different weighted combination of usage measures for different contexts, wherein instances of usage by the multiple users in the different contexts are given different levels of influence in the weighted combination according to the corresponding similarity scores indicating similarity between the contexts in which the instances of usage occurred and the context of the user; and providing, by the one or more computers, a response to the request that is determined based on the customized weights for the connections among the objects indicated by the semantic graph data.

2. The method of claim 1, wherein the request is a query, and wherein the response to the request comprises one or more search results responsive to the query, wherein the one or more search results are selected or ranked based on the customized weights for the connections.

3. The method of claim 1, wherein the request is a request for at least one of a recommendation, a suggestion, or a prediction determined using a semantic graph.

4. The method of claim 1, wherein the response comprises at least one of a search result, a metric, an attribute, an entity name, a data source, a document, a dashboard, or a visualization.

5. The method of claim 1, wherein the usage data indicates multiple accesses to a first object associated with different contexts, and wherein determining the customized weights comprises adjusting weights of connections to the first object according to a similarity of the different contexts to the context associated with the request.

6. The method of claim 1, wherein determining the customized weights comprises:

determining an adjustment for a first weight indicated by the semantic graph data for a connection between a first object and a second object, the adjustment being based on one or more similarity scores indicating a degree of similarity between a context for a previous access to the first object and the context associated with the request; and applying the adjustment to the first weight to determine a customized weight for the connection between the first object and the second object.

7. The method of claim 6, wherein the adjustment is a scaling factor or an additive offset.

8. The method of claim 1, wherein determining the customized weights comprises:

determining a subset of the usage data indicating use of a first object associated with a context having a similarity with the context associated with the request that satisfies a threshold; and determining a customized weight for a connection with the first object based on the subset of the usage data.

9. The method of claim 1, wherein determining the customized weights comprises determining a customized weight for a connection between a first object and a second object based on a weighted combination of uses of the first object, wherein the uses of the first object are weighted according to the respective similarity of the contexts of the uses and the context associated with the request.

10. The method of claim 1, wherein determining the customized weights comprises determining a customized weight for a connection between a first object and a second object based on a weighted combination of different usage measures of the first object, the different usage measures each representing different groups of uses of the first object.

11. The method of claim 10, wherein the different groups of uses comprise groups of multiple instances of use of the first object, the groups respectively representing uses associated with different users, different user roles, different organizations, different departments, different locations, different time ranges, different types of access, and/or different devices.

12. The method of claim 1, wherein determining the customized weights comprises determining a customized weight for a connection of a first object and a second object that includes multiple adjustments based on multiple different contextual factors.

13. The method of claim 1, wherein the context associated with the request and the contexts associated with the usage data each indicate at least one of a a time, a location, a topic, a keyword, a task, an application, a type of access, a type of device of device, or a mode of access.

14. The method of claim 1, wherein the context associated with the request indicates characteristics of a logical or physical environment of a device that submitted the request.

15. The method of claim 1, wherein generating the usage data comprises tracking multiple types of actions involving the objects, the actions including at least one of requesting, serving, reading, writing, saving, printing, sharing, or selecting the objects.

16. The method of claim 1, wherein determining the customized weights for the connections among the objects comprises determining user-specific weights for the connections, the user-specific weights being based at least in part on (i) prior actions of the user with respect to the objects and/or (ii) aggregations of usage data of multiple users determined based on characteristics of the user or prior actions of the user.

17. The method of claim 1, wherein the semantic graph data indicates connections among the objects that represent different types of relationships among the objects, wherein the different types of relationships include at least one of a dependency of an object on another object, a co-occurrence of an object with another object, an object being an instance of a class or category represented by another object, an object being a part of another object, or an object using or accessing another object.

18. A system comprising:
one or more computers; and
one or more non-transitory computer-readable media storing instructions that, when executed by the one or more computers, cause the one or more computers to perform operations comprising:
- storing, by the one or more computers, semantic graph data indicating objects and relationships among the objects;
- generating, by the one or more computers, usage data indicating (i) instances of usage of the objects by multiple users and (ii) contexts in which the objects have been used by the multiple users;
- receiving, by the one or more computers, (i) a request associated with a user and (ii) context data indicating a context of the user associated with the request;
- in response to receiving the request, determining, by the one or more computers, customized weights for connections among the objects, wherein the customized weights are customized for the user and are based on accesses of the multiple users to the objects, wherein the customized weights are determined by:
  - determining similarity scores each indicating a degree of similarity between a different one of the contexts indicated by the usage data and the context associated with the request; and
  - generating each of the customized weights based on a different weighted combination of usage measures for different contexts, wherein instances of usage by the multiple users in the different contexts are given different levels of influence in the weighted combination according to the corresponding similarity scores indicating similarity between the contexts in which the instances of usage occurred and the context of the user; and
- providing, by the one or more computers, a response to the request that is determined based on the customized weights for the connections among the objects indicated by the semantic graph data.

19. One or more non-transitory computer-readable media storing instructions that, when executed by one or more computers, cause the one or more computers to perform operations comprising:
- storing, by the one or more computers, semantic graph data indicating objects and relationships among the objects;
- generating, by the one or more computers, usage data indicating (i) instances of usage of the objects by multiple users and (ii) contexts in which the objects have been used by the multiple users;
- receiving, by the one or more computers, (i) a request associated with a user and (ii) context data indicating a context of the user associated with the request;
- in response to receiving the request, determining, by the one or more computers, customized weights for connections among the objects, wherein the customized weights are customized for the user and are based on accesses of the multiple users to the objects, wherein the customized weights are determined by:
  - determining similarity scores each indicating a degree of similarity between a different one of the contexts indicated by the usage data and the context associated with the request; and
  - generating each of the customized weights based on a different weighted combination of usage measures for different contexts, wherein instances of usage by the multiple users in the different contexts are given different levels of influence in the weighted combination according to the corresponding similarity scores indicating similarity between the contexts in which the instances of usage occurred and the context of the user; and
- providing, by the one or more computers, a response to the request that is determined based on the customized weights for the connections among the objects indicated by the semantic graph data.

* * * * *